United States Patent
Lee et al.

(10) Patent No.: US 8,681,701 B2
(45) Date of Patent: Mar. 25, 2014

(54) MOBILE COMMUNICATIONS DEVICES AND TRANSMISSION METHODS FOR TRANSMITTING MACHINE TYPE COMMUNICATION DATA THEREOF

(75) Inventors: Anthony Lee, San Diego, CA (US); Guotong Wang, Beijing (CN)

(73) Assignee: Via Telecom Co., Ltd., George Town, Grand Cayman (KY)

( * ) Notice: Subject to any disclaimer, the term of this patent is extended or adjusted under 35 U.S.C. 154(b) by 285 days.

(21) Appl. No.: 13/153,210

(22) Filed: Jun. 3, 2011

(65) Prior Publication Data

US 2011/0299492 A1 Dec. 8, 2011

Related U.S. Application Data

(60) Provisional application No. 61/351,101, filed on Jun. 3, 2010.

(51) Int. Cl.
*H04Q 7/00* (2006.01)
*H04L 12/28* (2006.01)

(52) U.S. Cl.
USPC .......................................... 370/328; 370/392

(58) Field of Classification Search
USPC .............. 370/230, 328, 329, 338, 392, 395.2, 370/395.21, 395.4, 468
See application file for complete search history.

(56) References Cited

U.S. PATENT DOCUMENTS

| | | | | |
|---|---|---|---|---|
| 7,751,323 | B2 * | 7/2010 | Kim et al. | 370/230 |
| 8,130,709 | B2 * | 3/2012 | Kim et al. | 370/329 |
| 8,358,619 | B2 * | 1/2013 | Cho et al. | 370/329 |
| 2009/0129326 | A1 * | 5/2009 | Kim et al. | 370/329 |
| 2009/0268666 | A1 * | 10/2009 | Vujcic | 370/328 |
| 2010/0238885 | A1 * | 9/2010 | Borran et al. | 370/329 |
| 2011/0128911 | A1 * | 6/2011 | Shaheen | 370/328 |
| 2011/0268046 | A1 * | 11/2011 | Choi et al. | 370/329 |
| 2011/0292893 | A1 * | 12/2011 | Lee et al. | 370/329 |
| 2012/0275305 | A1 * | 11/2012 | Lin | 370/235 |

* cited by examiner

*Primary Examiner* — Hong Cho
(74) *Attorney, Agent, or Firm* — McClure, Qualey & Rodack, LLP

(57) ABSTRACT

A mobile communications device with a wireless module and a controller module for performing an enhanced access procedure is provided. The wireless module performs wireless transmissions and receptions to and from a cellular station of a service network. The controller module transmits a random access preamble to the cellular station via the wireless module, receives a random access response message corresponding to the random access preamble from the cellular station via the wireless module, and transmits a scheduled transmission message including the MTC (machine type communication) data from the cellular station via the wireless module, in response to the random access response message. Then, the controller module completes the enhanced access procedure in response to receiving a contention resolution message from the cellular station via the wireless module.

19 Claims, 5 Drawing Sheets

MOBILE COMMUNICATIONS DEVICES AND TRANSMISSION METHODS FOR TRANSMITTING MACHINE TYPE COMMUNICATION DATA THEREOF

CROSS REFERENCE TO RELATED APPLICATIONS

This Application claims priority of U.S. Provisional Application No. 61/351,101, filed on Jun. 3, 2010, and the entirety of which is incorporated by reference herein.

BACKGROUND OF THE INVENTION

1. Field of the Invention

The invention generally relates to mobile communication technologies, and more particularly, to random access procedures applied in machine type communication data for use in mobile communication devices and related data transmission methods.

2. Description of the Related Art

In a typical mobile communications environment, a user equipment (UE) may communicate voice and/or data signals with one or more service networks via cellular stations (or referred to as evolved Node-Bs (eNBs)) of service networks. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others.

In LTE wireless communication system, a UE may initiate a random access procedure to establish contact with the cellular station (eNB) for any of the following events: (1) Initial access from a RRC_IDLE state; (2) Initial access after a radio link failure; (3) Handover requiring random access procedure; (4) Downlink (DL) data arrival during a RRC_CONNECTED state requiring random access procedure; (5) Uplink data arrival during RRC_CONNECTED requiring random access procedure. Moreover, the random access procedure can be performed by contention-based or non-contention-based manner depending on whether a Random Access Channel (RACH) resource used by the UE is assigned by the network or randomly selected by the UE itself.

Please refer to FIG. 1. FIG. 1 is a message sequence chart illustrating a conventional contention-based random access procedure performed for access to a LTE network by a UE. As shown in FIG. 1, the contention-based random access procedure mainly includes the following four steps: (1) random access preamble step on Physical Random Access Channel (PRACH) (step S110); (2) random access response step on Physical Downlink Shared CHannel (PDSCH) (step S120); (3) scheduled transmission step on Physical Uplink Shared CHannel (PUSCH) (step S130); and (4) contention resolution step on Physical Downlink Control Channel (PDCCH) (step S140). First, when receiving a request, in step S110, a random access procedure is triggered by the radio resource control (RRC) layer or the medium access control (MAC) layer and the UE transmits a RANDOM ACCESS PREAMBLE message to the cellular station by using a randomly selected Random Access CHannel (RACH) resource. Thereafter, in step S120, the cellular station replies a RANDOM ACCESS RESPONSE message including the identification information of the cellular station (e.g. the Cell Global Identity (CGI) of the cellular station) and resource configuration information to the UE, wherein the CGI is used for identifying a node within a network and the resource configuration information is used for indicating the resource configuration required to be allocated for subsequent data transmission. After receiving the valid RANDOM ACCESS RESPONSE message from the cellular station, in step S130, the UE allocates the resources according to the resource configuration information and transmits a SCHEDULED TRANSMISSION message with UE identification information to the cellular station using the allocated resources such that the cellular station may identify the UE. Then, in step S140, the cellular station transmits a CONTENTION RESOLUTION message containing specific UE identity information to the UE such that the contention can be resolved. When receiving the CONTENTION RESOLUTION message from the cellular station, the UE that the specific UE identity information corresponds to can complete the aforementioned random procedure. Detailed operation of the random access procedure is referable in related MAC specification, and is omitted herein for brevity. After the aforementioned random access procedure has been completed, the users can later perform data transmission (step S150).

Moreover, in current LTE wireless communication system, in addition to normal human-to-human (H2H) communications, machine type communication (MTC) is further provided. MTC is a Machine-to-Machine communication, also referred to as the Internet of Things (IOT), which concept is to connect real world objects to the Internet via the embedded short range mobile transceiver using the radio-frequency identification (RFID) for automatic recognition and information interconnecting and sharing for all of the objects.

Similarly, the aforementioned random access procedure has to be performed to enable the data transmission of MTC data regardless the data size of the MTC data to be transmitted each time a MTC is to be performed. In addition, in current LTE specification, it is impossible to transmit small size data over RACH channel as the RACH channel in LTE does not carry any data. Moreover, when a large amount of MTC devices are arranged within a specific area, a large amount of MTC control signaling may be generated, resulting in overloading of Mobility Management Entity (MME), unpredictable transmission delaying and even disabling the service of the network. Therefore, it is a desire to provide a solution to grantee that the loading of the network will not be affected by such MTC application.

BRIEF SUMMARY OF THE INVENTION

Accordingly, embodiments of the invention provide mobile communications devices and transmission methods for transmitting machine type communication data thereof. In one aspect of the invention, a mobile communications device with a wireless module and a controller module is provided. The wireless module performs wireless transmissions and receptions to and from a cellular station of a service network. The controller module transmits a random access preamble to the cellular station via the wireless module, receives a random access response message corresponding to the random access preamble from the cellular station via the wireless module, transmits a scheduled transmission message including the MTC (machine type communication) data to the cellular station via the wireless module, in response to the random access response message, and completes the enhanced access procedure in response to receiving a contention resolution message from the cellular station via the wireless module.

In another aspect of the invention, a transmission method for transmitting machine type communication (MTC) data for use in a mobile communications device with a wireless module is provided. The method comprises the steps of receiving a transmission request including a MTC data, transmitting a random access preamble to a cellular station of a service network, receiving a random access response message corresponding to the random access preamble from the cellular station, determining whether the data size of the MTC data is less than or equal to a predetermined threshold value, when determining that the data size of the MTC data is less than or equal to a predetermined threshold value, generating a scheduled transmission message including the MTC data, and transmitting the scheduled transmission message including the MTC data to the cellular station.

Other aspects and features of the present invention will become apparent to those with ordinarily skill in the art upon review of the following descriptions of specific embodiments of apparatuses and transmission method for transmitting machine type communication (MTC) data.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Generally, in current LTE wireless communication system, the aforementioned random access procedure has to be completed to enable the data transmission of MTC data regardless the data size of the MTC data to be transmitted when each time a MTC is to be performed. This may result in a large amount of signaling overhead. The invention considers that MTC data are typically transmitted by a way of small size data and are frequently transmitted, as there is resource allocated for transmission over PUSCH in the scheduled transmission step of the aforementioned random access procedure, if the small size data for MTC can also be sent over the same allocated resource in this step, there is no need to allocate another PUSCH resource for MTC data after the access procedure has completed. Thus, the invention provides an enhanced random access procedure which may, when receiving a data transmission request for MTC applications and the data size of the MTC data to be transmitted matches to a predetermined transmission data size requirement, include the MTC data into the scheduled transmission message and then transmit the scheduled transmission message to the cellular station after the random access response message from the cellular station has been received. Therefore, there is no need to allocate another PUSCH resource for MTC data after the access procedure has completed, thereby efficiently reducing additional resource configuration and control signaling transmission overhead and improving the overall system performance. It is to be note that, because the UE needs to attach to the network before sending data, it is difficult to apply the proposed enhanced access procedure for initial random access case. Therefore, the enhanced access procedure of the invention is mainly applied in the scenario that MTC device has already attached to the network and small size traffic data comes in has detected when it is in idle state.

Figure 1:
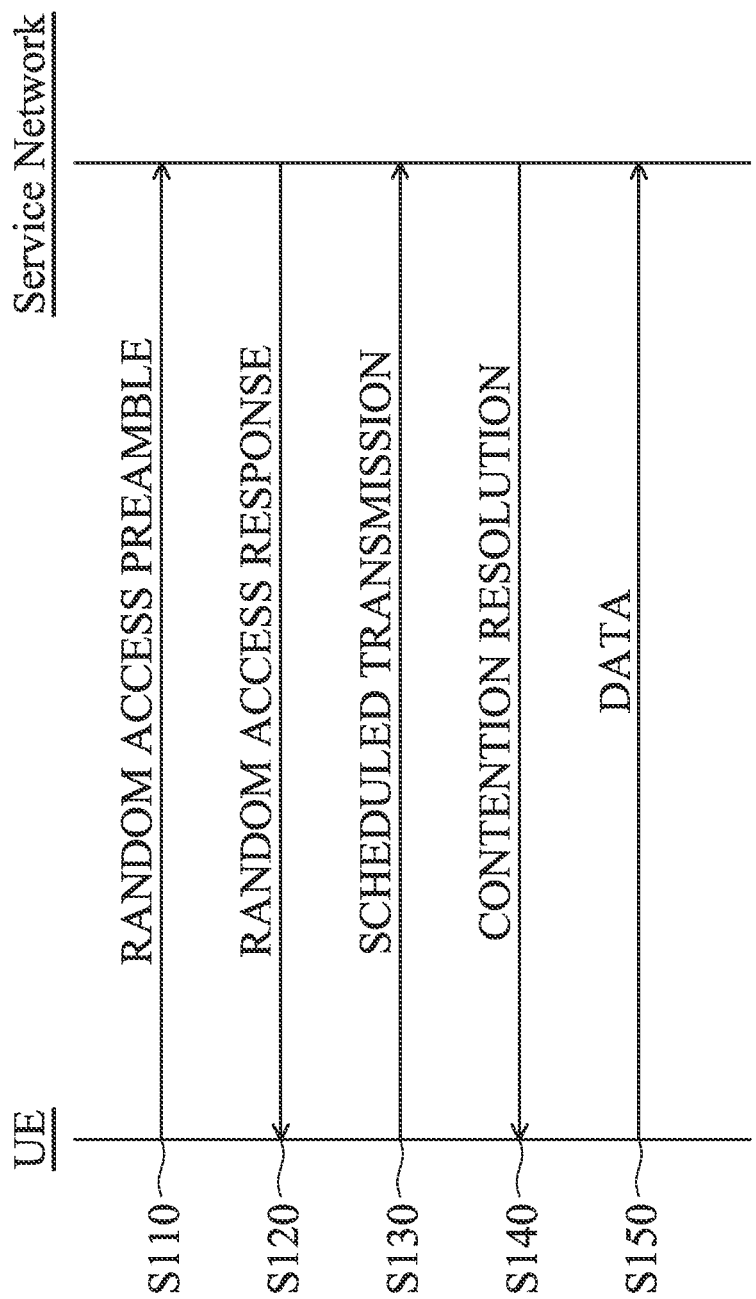
FIG. 1 is a message sequence chart illustrating a conventional contention-based random access procedure performed for access to a LTE network by a UE.
Figure 2:
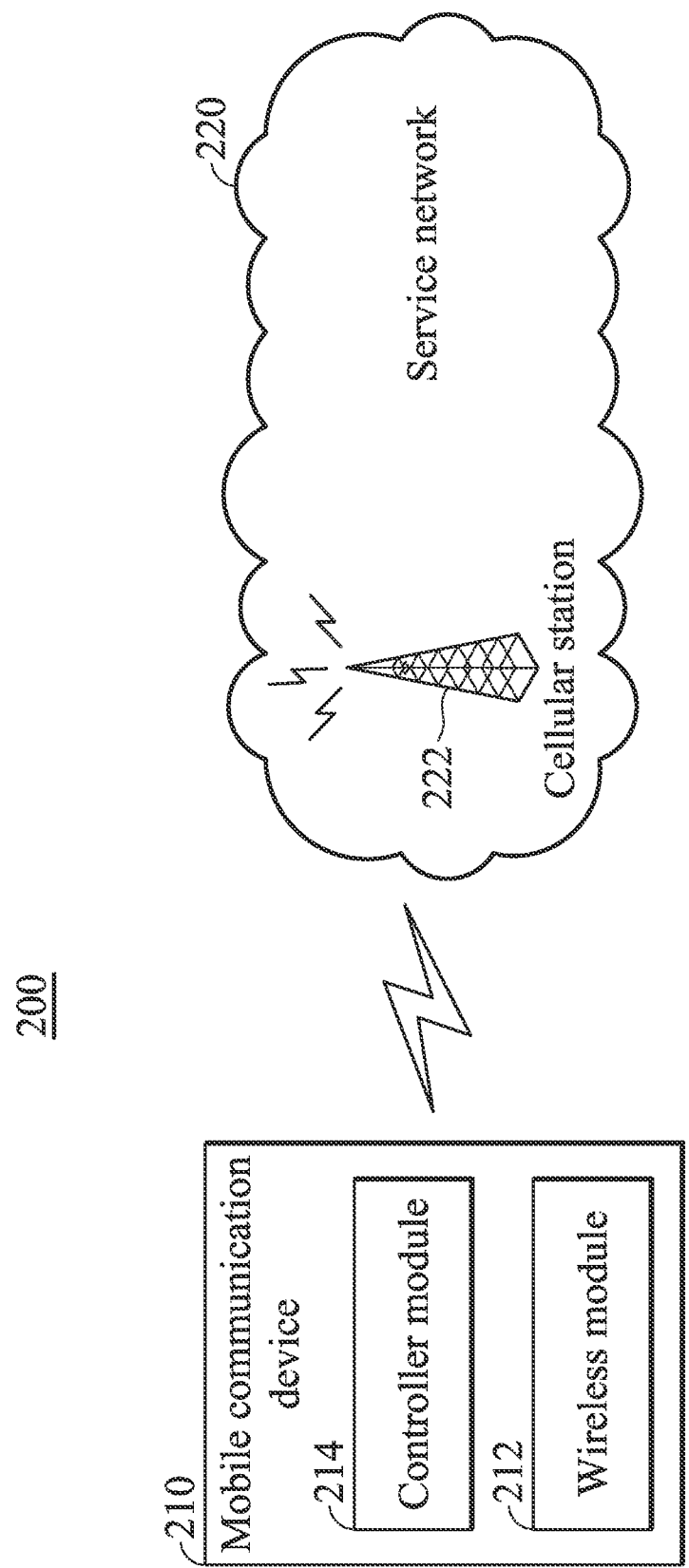
FIG. 2 is a block diagram illustrating a mobile communication environment according to an embodiment of the invention.

FIG. 2 is a block diagram illustrating a mobile communications system according to an embodiment of the invention. In the mobile communications system 200, the mobile communications device 210 is wirelessly connected to the cellular station 222 of the service network 220 for obtaining wireless services. Generally, the mobile communications device 210 may be referred to as a User Equipment (UE) and the cellular station 222 may be referred to as a base station, an access station or an evolved Node B (eNB) in LTE system. In this embodiment, the mobile communication device 210 may a MTC capable device which is a device supporting MTC and can be used for performing machine to machine (M2M) communications with other MTC capable devices or systems. The mobile communication device 210 comprises a wireless module 212 for performing the functionality of wireless transmissions and receptions to and from the cellular station 222. To further clarify, the wireless module 212 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. Also, the mobile communication device 210 further comprises a controller module 214 for controlling the operation of the wireless module 212 and other functional components, such as a display unit and/or keypad serving as the MMI (man-machine interface), a storage unit storing the program codes of applications or communication protocols, or others. The service network 220 may also comprise a control node for controlling the operation of the at least one access node. The operation of the service network 220 is in compliance with a communication protocol. In one embodiment, the service network 220 may be an LTE network and the mobile communications device 210 may be a UE in compliance with one of the specifications of the LTE communication protocols, and the invention is not limited thereto.

To be more specific, the controller module 214 controls the wireless module 212 for performing an enhanced random access procedure with the service network 220 via the cellular station 222.

Figure 3:
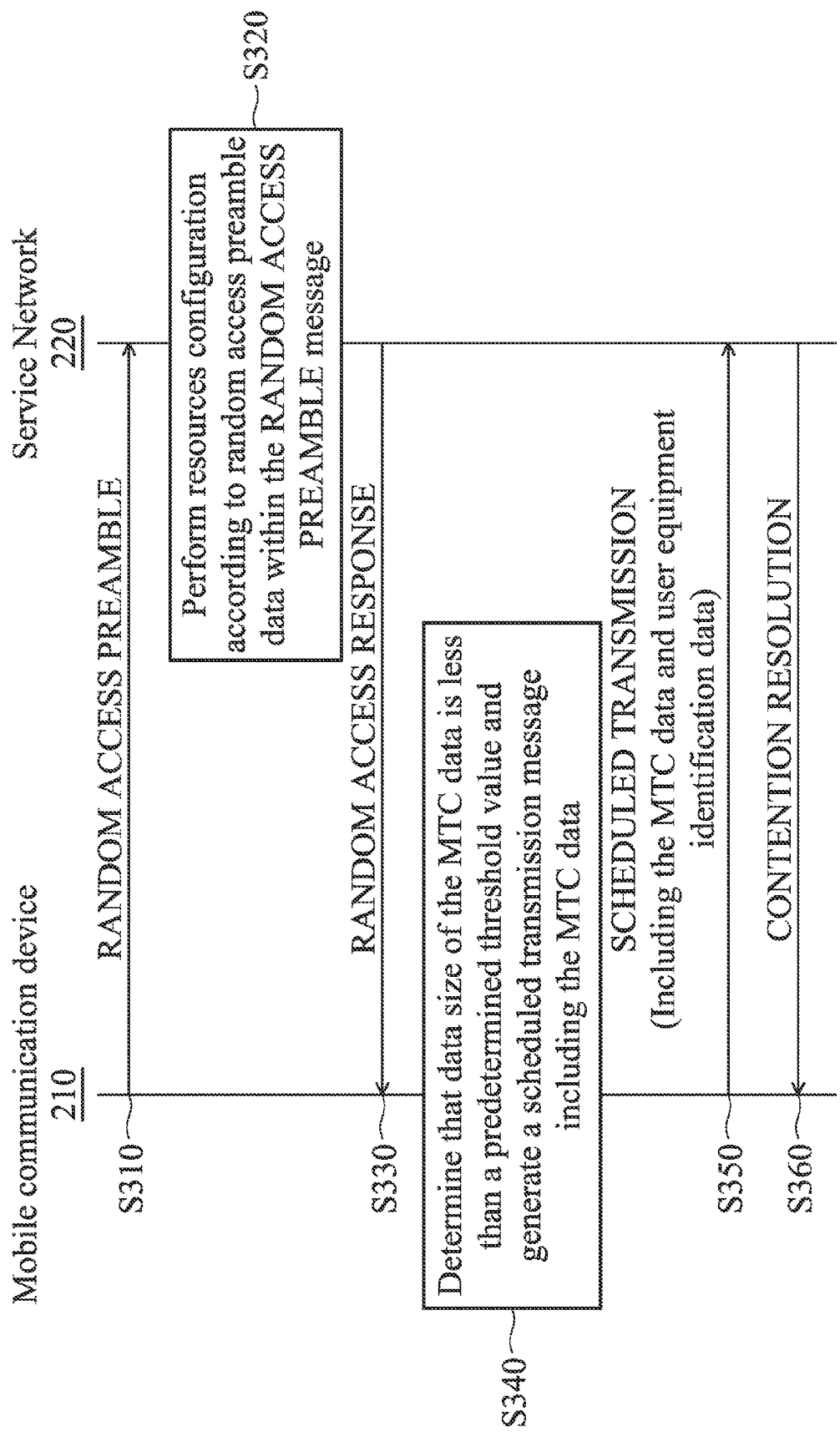
FIG. 3 is a message sequence chart illustrating an enhanced access procedure according to an embodiment of the invention.

FIG. 3 is a message sequence chart illustrating an enhanced random access procedure according to an embodiment of the invention. First, when receiving a data transmission request for MTC data, the mobile communications device 210 transmits a RANDOM ACCESS PREAMBLE message including a random access preamble to the service network 220 by using a randomly selected Random Access CHannel (RACH) resource (step S310). In this step, the mobile communications device 210 may select a proper random access preamble from a number of known preamble groups according to the data size of the MTC data to be transmitted. Generally, current access preambles are divided into two preamble groups, and the preamble group that one access preamble belongs to can be indicated by 1 bit information. The UE (the mobile communications device 210) may select an access preamble within the proper preamble group based on the data size it will transmit, and the cellular station 222 may then determine the amount of the resources allocated to the UE according to the selected preamble group.

Thereafter, the service network 220 receives the RANDOM ACCESS PREAMBLE message via the cellular station 222, performs a resource allocation for the mobile communications device 210 based on the random access preamble included in the RANDOM ACCESS PREAMBLE message (step S320), and thereafter, replies, in response to reception of the RANDOM ACCESS PREAMBLE message, a RANDOM ACCESS RESPONSE message including the identification information of the cellular station 222 (e.g. the CGI of the cellular station 222) and resource configuration information to the mobile communications device 210 (step S330). Note that the resource configuration information is used for indicating the resource configuration required to be allocated for subsequent data transmission. The cellular station 222 may perform the resource configuration by determining which preamble group the random access preamble transmitted by the mobile communications device 210 belongs to. For example, the cellular station 222 may allocate two resource blocks (RBs) for the mobile communications device 210 if the random access preamble belongs to a first group or may allocate four resource blocks (RBs) for the mobile communications device 210 if the random access preamble belongs to a second group. Subsequently, after receiving the RANDOM ACCESS RESPONSE message which includes the identification information of the cellular station 222 and resource configuration information from the cellular station via the wireless module 212, the controller module 214 further determines whether the data size of the MTC data to be transmitted is less than or equal to a predetermined threshold value and then determines whether to transmit the MTC data in the scheduled transmission step according to the comparison result. Note that the predetermined threshold value may be configured by the radio resource control (RRC) layer and broadcasted in the system information. Therefore, the mobile communications device 210 may obtain the value of the predetermined threshold value by receiving the system information broadcasted by the cellular station 222. Although not shown, the controller module 214 may first receive the system information which is broadcasted by the cellular station 222 and includes the predetermined threshold value via the wireless module 212, before the random access procedure is started. Thereafter, the controller module 214 may perform the determination operation in the scheduled transmission step by comparing the data size of the MTC data with the predetermined threshold value.

When the data size of the MTC data is greater than the predetermined threshold value, which means that the data size is too big and it can not be combined into the scheduled transmission message to sent at the same time, thus the controller module 214 performs a normal random access procedure to transmit a scheduled transmission message which does not include the MTC data to the cellular station 222 via the wireless module 212 and then perform resource configuration for transmitting the MTC data after receiving a contention resolution message corresponding to scheduled transmission message via the wireless module 212 from the cellular station 222. Accordingly, the controller module 214 performs a transmission of MTC data using the allocated resources. Otherwise, when the data size of the MTC data is less than or equal to the predetermined threshold value, which means that the data size is small enough, the controller module 214 performs the enhanced random access procedure of the invention to transmit a scheduled transmission message including the MTC data to the cellular station 222 via the wireless module 212. In this embodiment, it is assumed that the data size of the MTC data to be transmitted is less than the predetermined threshold value. Thus, the controller module 214 determines that the data size of the MTC data is less than the predetermined threshold value and generates a scheduled transmission message including the MTC data (step S340), performs resource configuration based on the resource configuration information and transmits the scheduled transmission message with the MTC data and UE identification information to the service network 220 using the allocated resources via the wireless module 212 (step S350). Specially, the controller module 214 transmits the scheduled transmission message on allocated resources over the PUSCH. Note that the controller module 214 may generate the scheduled transmission message by adding the MTC data into a MAC layer controlling message (or referred to as Message 3 or Msg3). Detail descriptions regarding how to generate the scheduled transmission message are illustrated in below with reference to FIG. 4.

After the service network 220 receives the scheduled transmission message via the cellular station 222, it may identify the mobile communication device which sends the random access request according to the specific UE identification information included in the scheduled transmission message and then transmits a contention resolution message with the specific UE identification information to the mobile communications device 210 via the cellular station 222 (step S360). Accordingly, the controller module 214 receives the contention resolution message which contains the specific UE identification information identifying the mobile communications device 210 via the wireless module 212, which means that the access channel between the mobile communications device 210 and the cellular station 222 has been successfully established, so that the enhanced access procedure is completed (step S370).

As there is resource allocated for transmission over PUSCH in the aforementioned scheduled transmission step, the small size data to be transmitted can also be transmitted together in the aforementioned scheduled transmission step if it is small enough, e.g. small size data for MTC. Therefore, there is no need to allocate another PUSCH resource for MTC data after the access procedure has completed, thereby reducing the number of required signaling.

Figure 4:
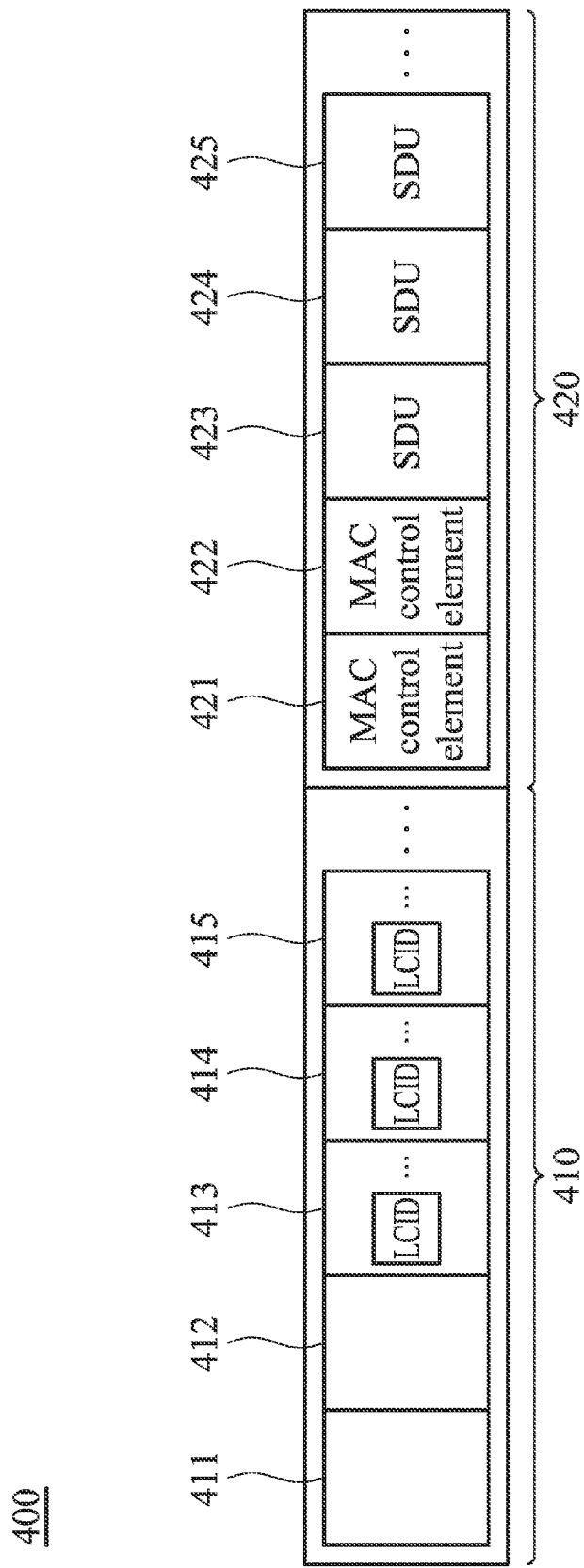
FIG. 4 is a schematic diagram illustrating an example of the data format of a medium access control message according to an embodiment of the invention.

As previously described, the controller module 214 may generate the scheduled transmission message by adding the MTC data into a MAC layer controlling message (or referred to as message Msg3). When the size of the required resources is small size data in the scheduled transmission step, the controller module 214 may concatenate the data part of the MTC data with the MAC message Msg.3. That is, the data and the message Msg3 may be carried in the same MAC protocol data unit (PDU). Note that the message Msg 3 may be carried in one or more MAC service data unit (SDU), and the data part of the MTC data can be included in another MAC SDU, wherein the data part of the MTC data and can have at least one logic channel identification data (LCID) corresponding to a sub-header, wherein the LCID field in corresponding sub-header indicates the used logical channel. Therefore, the controller module 214 may add one or more MAC layer SDU to carry the MTC data in a same MAC layer PDU containing the MAC message Msg 3 and may also add a sub-header for indicating the MTC data is stored in one or more MAC layer SDUs. Please refer to FIG. 4, which is a schematic diagram illustrating an example of the data format of a medium access control message according to an embodiment of the invention. As shown in FIG. 4, the MAC layer PDU 400 at least comprise a header 410 and a payload part 420, wherein the header 410 at least comprise sub-headers 411-415, which respectively corresponding to MAC control elements 421, 422 and SDUs 423, 424 and 425 within the payload part 420. The sub-headers 411 and 412 respectively correspond to the MAC control elements 421 and 422, which contains information related to the corresponding MAC control elements, such as type information and so on. Each of the sub-headers 413-415 at least comprises a logic channel identification data field LCID for indicating the logical channel associated with the corresponding MAC layer SDU. For example, the logic channel identification data field LCID in the sub-header 413 is used for indicating the logical channel associated with the MAC layer SDU 423, the logic channel identification data field LCID in the sub-header 414 is used for indicating the logical channel associated with the MAC layer SDU 424, the logic channel identification data field LCID in the sub-header 415 is used for indicating the logical channel associated with the MAC layer SDU 425, and so on. To be more specific, the logic channel identification data field LCID may comprise n bits for representing $2^n$ available logical channels. For example, there are 32 available logical channels if n=5. It is to be understood that each sub-header may further comprise other fields, e.g., a length field L for indicating the length of the corresponding SDU, and are well-known for those who are skilled in this technology, thus detailed is omitted herein as it is beyond the scope of the invention. Reference to the LTE MAC layer specifications for a detailed description regarding the data format of the sub-headers may be made, and is omitted herein.

In this embodiment, assume that the MAC message Msg 3 occupies two SDUs 423 and 424, as both the SDUs 423 and 424 represent the same MAC message Msg 3, the logic channel identification data fields LCID of the responsive sub-headers 413 and 414 are set to the same value. In addition, as the MTC data requires occupying one SDU, one SDU 425 is added subsequent to the SDUs 423 and 424 to carry the MTC data and a sub-header 415 is also added into the header 410 for indicating the attribute information of the SDU 425. To be more specific, as the MTC data is carried in the SDU 425, the logic channel identification data field LCID of the sub-header 415 that corresponds to the SDU 425 will be set to a value different from that of the sub-headers 413 and 414. Therefore, one or more sub-headers can be added into the MAC layer PDU for indicating that the MTC data is located in one or more MAC layer SDUs, and the cellular station 222 may, upon reception of the scheduled transmission message, analyze content of the received MAC layer PDU, determine whether the data included in each SDU of the received MAC layer PDU is control signal or the MTC data according to the value of the logic channel identification data field LCID in the responsive sub-header and then decode the MTC data from the received message.

Figure 5:
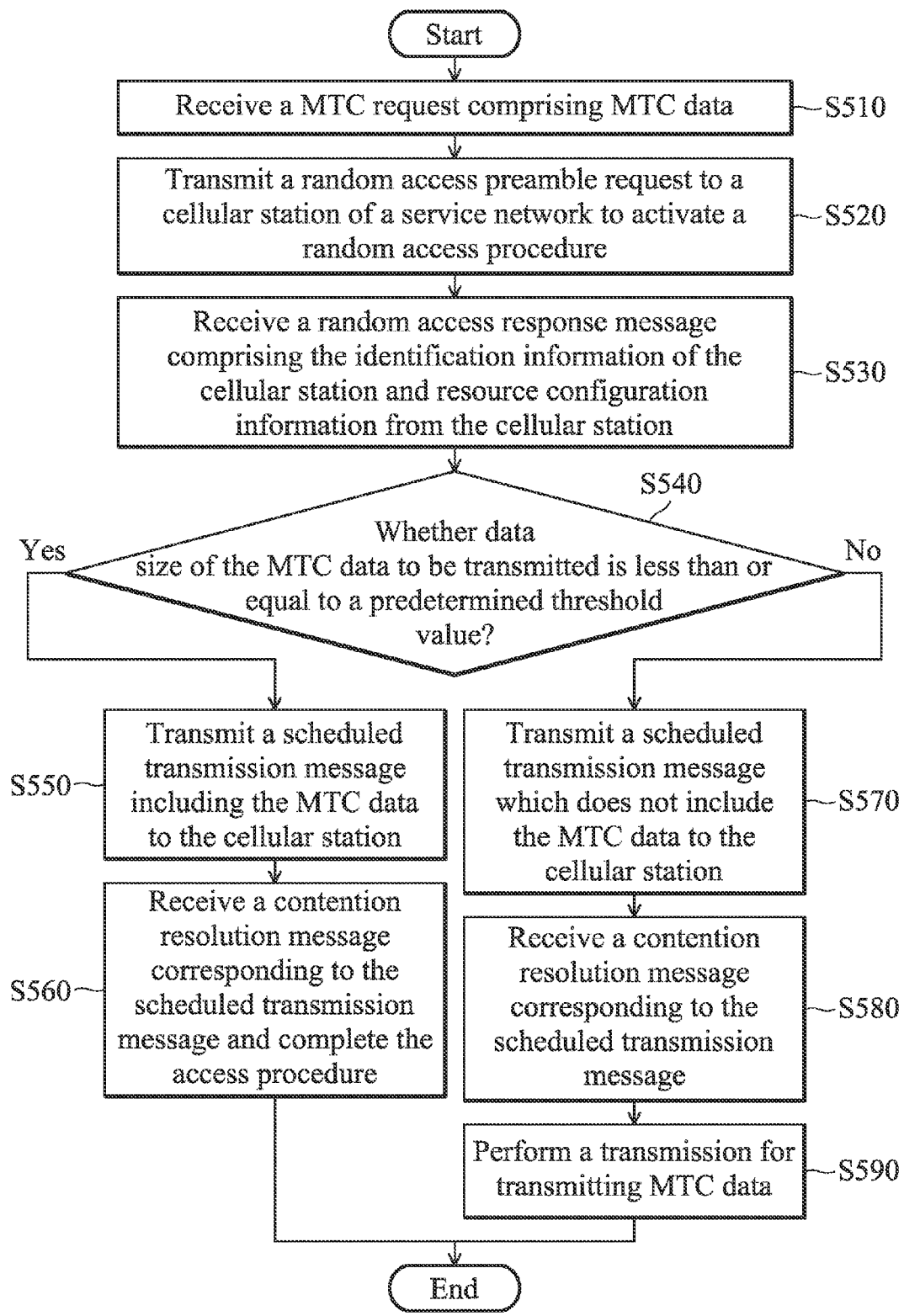
FIG. 5 is a flow chart illustrating a transmission method for transmitting machine type communication data according to an embodiment of the invention.

FIG. 5 is a flow chart illustrating a data transmission method for MTC data according to an embodiment of the invention. In this embodiment, the data transmission method for MTC data may be applied in a mobile communications device with a wireless module as shown in FIG. 2, wherein the wireless module is used for performing the functionality of wireless transmissions and receptions to and from the cellular station. In this embodiment, the mobile communication device applies a threshold value for the MTC data to determine whether to utilize the enhanced access procedure of the invention. When the data size of the MTC traffic data is less than or equal to the threshold value, the enhanced access procedure is utilized, i.e., the small size MTC data will be transmitted in the scheduled transmission step to the cellular station. Contrarily, when the data size of the MTC traffic data is greater than the threshold value, the normal access procedure is utilized, i.e., the MTC data will be transmitted to the cellular station only after all of the access procedure has been completed.

First, the mobile communications device receives a data transmission request for MTC data including MTC data (step S510), and thus transmits a RANDOM ACCESS PREAMBLE message including a random access preamble to a service network via the wireless module to start a random access procedure (step S520). In this step, the mobile communications device may transmit the RANDOM ACCESS PREAMBLE message using a randomly selected Random Access CHannel (RACH) resource according to the data size of the MTC data to be transmitted via the wireless module. In this embodiment, the random access preambles can be divided into more preamble groups for representing various resource requirements.

Thereafter, the mobile communications device receives a RANDOM ACCESS RESPONSE message including the identification information of the cellular station (e.g. the CGI of the cellular station) and a resource configuration information from the cellular station via the wireless module (step S530). Note that the service network may perform, upon reception of the RANDOM ACCESS PREAMBLE message via the cellular station, a resource allocation for the mobile communications device 10 based on the random access preamble included in the RANDOM ACCESS PREAMBLE message, and thereafter, replies, in response to reception of the RANDOM ACCESS PREAMBLE message, the RANDOM ACCESS RESPONSE message to the mobile communications device via the cellular station.

Next, the mobile communications device further determines whether the data size of the MTC data to be transmitted is less than or equal to a predetermined threshold value (step S540), and if so, performs the enhanced random access procedure of the invention to transmit a scheduled transmission message including the MTC data to the cellular station via the wireless module. For example, the predetermined threshold value may be configured by the RRC layer and broadcasted in the system information, and the mobile communications device may obtain the value of the predetermined threshold value by receiving the system information broadcasted by the cellular station. In some embodiment, the mobile communications device may generate the scheduled transmission message by adding the MTC data into original MAC layer controlling message Msg3. For example, one or more subheaders can be added into the MAC layer PDU for indicating that the MTC data is located in one or more MAC layer SDUs, and the logic channel identification data fields LCID of the responsive sub-headers will be set to a value indicating user data.

Thereafter, the mobile communications device receives a contention resolution message which contains the specific UE identification information identifying the mobile communications device via the wireless module and determines that the enhanced access procedure is completed (step S560). Note that, in this case, the contention resolution message is sent by the service network after the scheduled transmission message has been received via the cellular station, wherein the contention resolution message contains the specific UE identification information.

Subsequent to step S540, if not, the mobile communications device performs a normal random access procedure to transmit a scheduled transmission message which does not include the MTC data to the cellular station via the wireless module (step S570), perform resource configuration for transmitting the MTC data after receiving a contention resolution message corresponding to scheduled transmission message via the wireless module from the cellular station, and perform a transmission of MTC data using the allocated resources (step S590).

In addition, as aforementioned, in the current access scheme, the access preambles are divided into two groups, which may not meet the resource requirement of different traffic sizes needed in the scheduled transmission step of the invention. Therefore, in some embodiment, for the enhanced access procedure of the invention, the access preambles are further divided into more preamble groups to indicate the resource needed in the scheduled transmission step of the invention. For example, in some embodiments, the access preambles may be divided into four groups, which can be represented by 2 bits information. That is, the four groups may indicate the resource needed in the scheduled transmission step is 1 RB, 2RBs, 3RBs and 4RBs, respectively.

It is to be understood that, the number of preamble groups may be related with the threshold value. For example, in above example, the threshold value is 4 RBs. Note that each group may have the same amount of preambles or each group may have different amount of preambles. For example, if 64 selectable preambles are provided, the number of the preambles within the preamble groups A, B, C and D are both 16 in one embodiment while the number of the preambles within the preamble groups A, B, C and D are 8, 16, 8 and 32 in another embodiment, and the invention is not limited thereto.

In addition, when the same contention resources (RACH resources) are shared by both MTC devices and H2H devices, probability of access collision for the MTC devices and the H2H devices are the same. In order to prevent data transmission of H2H devices being affected by that of MTC devices, in some embodiments, the enhanced access procedure of the invention further combined with access resource/preamble separation for MTC to distribute the contention resources to the H2H application group and the MTC application group such that devices within each group can be allocated a dedicated contention resource to efficiently obtain the resource for data transmission. The access resource/preamble separation for MTC is a technique that utilizes different groups or specific resource configurations for the M2M data transmission of MTC or the user data transmission of H2H. For example, the M2M data may be transmitted at fixed time slot slot1 while the user data may be transmitted at time slot slot2. Therefore, the enhanced access procedure of the invention may further be combined with the resource/preamble which is dedicated to MTC applications to efficiently reduce the transmission latency among MTC devices.

The method may be implemented in program code stored in a machine-readable storage medium, such as a magnetic tape, semiconductor, magnetic disk, optical disc (e.g., CD-ROM, DVD-ROM, etc.), or others, and when loaded and executed by a processing unit, a micro-control unit (MCU), or the controller module 214 in FIG. 2, the program code may perform the transmission method for transmitting MTC data. In addition, the method may be applied to any MTC capable mobile communications device supporting the WCDMA technology and/or the LTE technology.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A mobile communications device for performing an enhanced access procedure, comprising:
    a wireless module, performing wireless transmissions and receptions to and from a cellular station of a service network; and
    a controller module, transmitting a random access preamble to the cellular station via the wireless module, receiving a random access response message corresponding to the random access preamble from the cellular station via the wireless module, transmitting a scheduled transmission message including machine type communication (MTC) data which is traffic data located in one or more MAC layer service data units to the cellular station via the wireless module, in response to the random access response message, and completing the enhanced access procedure in response to receiving a contention resolution message from the cellular station via the wireless module,
    wherein prior to the transmission of the scheduled transmission message, the controller module further determines whether the data size of the machine type communication data is less than or equal to a predetermined threshold value, wherein the step of transmitting the scheduled transmission message is performed in response to the data size of the machine type communication data being less than or equal to the predetermined threshold value.

2. The mobile communications device of claim 1, wherein in response to the data size of the machine type communication data being greater than the predetermined threshold value, the controller module further transmits a scheduled transmission message which does not include the machine type communication data to the cellular station via the wireless module, and transmits the machine type communication data to the cellular station via the wireless module upon reception of the contention resolution message from the cellular station.

3. The mobile communications device of claim 1, wherein the scheduled transmission message further comprises a medium access control (MAC) layer protocol data unit (PDU), and the controller module further adds at least one MAC layer service data unit (SDU) in the MAC layer PDU for including the machine type communication data and generates the scheduled transmission message according to the MAC layer PDU which includes the machine type communication data.

4. The mobile communications device of claim 3, wherein the MAC layer PDU further comprises a MAC layer header, and the controller module further adds at least one sub-header in the MAC layer header to correspond to the at least one MAC layer SDU.

5. The mobile communications device of claim 4, wherein the at least one sub-header comprises at least one logic channel identification corresponding to the at least one MAC layer SDU.

6. The mobile communications device of claim 4, wherein the scheduled transmission message is transmitted on a Physical Uplink Shared Channel (PUSCH).

7. The mobile communications device of claim 1, wherein the predetermined threshold value is obtained from system information broadcasted by the cellular station.

8. The mobile communications device of claim 1, wherein the random access preambles are divided into at least two or above preamble groups.

9. The mobile communications device of claim 1, wherein the controller module further provides access resources dedicated for the machine type communication data to separate the machine type communication data from user data used for human-to-human (H2H) communication.

10. A transmission method for transmitting machine type communication (MTC) data for use in a mobile communications device with a wireless module, comprising:
receiving a transmission request including a machine type communication data which is traffic data located in one or more MAC layer service data units;
transmitting a random access preamble to a cellular station of a service network;
receiving a random access response message corresponding to the random access preamble from the cellular station;
determining whether the data size of the machine type communication data is less than or equal to a predetermined threshold value;
when determining that the data size of the machine type communication data is less than or equal to a predetermined threshold value, generating a scheduled transmission message including the machine type communication data; and
transmitting the scheduled transmission message including the machine type communication data to the cellular station.

11. The transmission method of claim 10, further comprising:
receiving a contention resolution message corresponding to the scheduled transmission message from the cellular station after the scheduled transmission message including the machine type communication data has been transmitted to the cellular station.

12. The transmission method of claim 10, further comprising:
in response to the data size of the machine type communication data being greater than the predetermined threshold value, generating a scheduled transmission message which does not include the machine type communication data;
transmitting the scheduled transmission message which does not include the machine type communication data to the cellular station; and
transmitting the machine type communication data to the cellular station upon reception of the contention resolution message from the cellular station.

13. The transmission method of claim 10, wherein the scheduled transmission message further comprises a medium access control (MAC) layer protocol data unit (PDU), and the step of generating the scheduled transmission message including the machine type communication data further comprises:
adding at least one MAC layer service data unit (SDU) in the MAC layer PDU for including the machine type communication data; and
generating the scheduled transmission message according to the MAC layer PDU which includes the machine type communication data.

14. The transmission method of claim 13, wherein the MAC layer PDU further comprises a MAC layer header, and the step of generating the scheduled transmission message according to the MAC layer PDU which includes the machine type communication data further comprising:
adding at least one sub-header in the MAC layer header to correspond to the at least one MAC layer SDU.

15. The transmission method of claim 14, wherein the at least one sub-header comprises at least one logic channel identification corresponding to the at least one MAC layer SDU.

16. The transmission method of claim 10, wherein the predetermined threshold value is obtained from system information broadcasted by the cellular station.

17. The transmission method of claim 10, wherein the random access preambles are divided into at least two or above preamble groups.

18. The transmission method of claim 10, further comprising:
providing access resources dedicated for the machine type communication data to separate the machine type communication data from user data used for human-to-human (H2H) communication.

19. The transmission method of claim 10, wherein the scheduled transmission message is transmitted on a Physical Uplink Shared Channel (PUSCH).

* * * * *